United States Patent
Kalechstain et al.

(10) Patent No.: US 10,565,648 B1
(45) Date of Patent: Feb. 18, 2020

(54) MOBILE COMMUNICATION DEVICE, METHODS AND SYSTEMS

(71) Applicant: CITIBANK, N.A., New York, NY (US)

(72) Inventors: Noa Kalechstain, Tel-Aviv (IL); Raphael Menachem, Tel-Aviv (IL); Dor Nir, Savion (IL); Sagiv Shahori, Tel-Aviv (IL); Tsafrir Atar, Gany Tikva (IL); Ofir Eyal, Tel-Aviv (IL)

(73) Assignee: CITIBANK, N.A., New York, NY (US)

( * ) Notice: Subject to any disclaimer, the term of this patent is extended or adjusted under 35 U.S.C. 154(b) by 595 days.

(21) Appl. No.: 15/057,316

(22) Filed: Mar. 1, 2016

Related U.S. Application Data (60) Provisional application No. 62/127,084, filed on Mar. 2, 2015.

(51) Int. Cl.
| | | |
|---|---|---|
| *G06Q 40/00* | (2012.01) | |
| *G06Q 40/04* | (2012.01) | |
| *H04B 1/3827* | (2015.01) | |

(52) U.S. Cl.
CPC .............. *G06Q 40/04* (2013.01); *H04B 1/385* (2013.01)

(58) Field of Classification Search
CPC ..................................................... G06Q 40/04
USPC ............................................................ 705/37
See application file for complete search history.

(56) References Cited

U.S. PATENT DOCUMENTS

| 7,555,257 | B2 * | 6/2009 | Grossman | G06Q 40/04 455/3.01 |
|---|---|---|---|---|
| 2016/0058133 | A1 * | 3/2016 | Fournier | H04B 1/3888 455/41.2 |
| 2017/0340221 | A1 * | 11/2017 | Cronin | A61B 5/747 |

OTHER PUBLICATIONS

Weblog Post; "Zack Investment Research: Dow 30 Stock Roundup: Chevron, Exxon Beat Estimates . . . "; Newstex Finance & Accounting Blogs, Chatham: Newstex, Nov. 7, 2014. (Year: 2014).*

* cited by examiner

*Primary Examiner* — Edward Chang
(74) *Attorney, Agent, or Firm* — Johnson, Marcou, Isaacs & Nix, LLC; John M. Harrington (57) ABSTRACT

Mobile communication devices, systems, and methods involve receiving an extension of a trading-related application running on a mobile computing device by one or more processors of a wearable computing device and displaying a visualization of trading-related data on a display screen of the wearable computing device received via wireless communication with the mobile computing device from one or more back-end servers. A capture of input on the wearable computing device is detected by the mobile computing device via wireless communication with the wearable computing device and forwarded by the mobile computing device to the one or more backend servers.

15 Claims, 9 Drawing Sheets

MOBILE COMMUNICATION DEVICE, METHODS AND SYSTEMS

PRIORITY APPLICATION

This application claims priority to U.S. Provisional Application No. 62/127,084 filed Mar. 2, 2015, entitled "Mobile Communication Device, Methods and Systems", which is incorporated herein by this reference.

FIELD OF THE INVENTION

The present invention relates generally to the field of mobile communication device functionality and more particularly to interactive mobile communication devices, methods and systems involving mobile and wearable computing devices, such as smart phones and smart watches.

BACKGROUND OF THE INVENTION

Currently, electronic financial trading systems may include functionality, for example, to create and amend trade orders. In such systems, a trade order may typically be displayed as a form with various text-based input fields originally developed for large display screens and the use of desktop computer input devices such as a mouse and keyboard. In recent years, wearable communication devices in the form of smart watches with mobile phone capability have been developed with functionality beyond mere timekeeping that are effectively wearable computing devices running, for example, mobile operating systems and mobile applications.

Obviously, the large screens and mouse and keyboard input devices currently employed in electronic trading systems do not exist on such wearable communication devices, which may typically have only a touchscreen for user input. Thus, while the current solution is suitable for desktop computers, it is unusable, for example, to create or amend trade orders on wearable mobile devices. There is a present need for a solution that resolves all of the foregoing issues and provides, for example, improved methods and systems for performing electronic transactions interactively using a touchscreen interface on wearable mobile communication devices that are not currently available.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the methods described herein.

Thus, embodiments of the invention provide methods and systems that involve, for example, receiving, by one or more processors of a wearable computing device, an extension of a trading-related application running on one or more processors of a mobile computing device in wireless communication with the wearable computing device; displaying, by the one or more processors of the wearable computing device on a display screen of the wearable computing device, a visualization of trading-related data received via wireless communication with the one or more processors of the mobile computing device from one or more processors of one or more back-end servers in communication with the mobile computing device; detecting, by the one or more processors of the mobile computing device via wireless communication with the one or more processors of the wearable computing device, a capture of input on the wearable computing device; and forwarding, by the one or one or more processors of the mobile computing device, the captured input to one or more processors of one or more backend servers in communication with the mobile computing device.

In aspects of embodiments of the invention, receiving the extension of the trading-related application by the one or more processors of the wearable computing device may involve, for example, downloading the trading-related application to the one or more processors of the mobile computing device. In other aspects, downloading the trading-related application may involve, for example, downloading an FX trading-related application to the one or more processors of the mobile computing device. In further aspects, receiving the extension of the trading-related application by the one or more processors of the wearable computing device may involve, for example, synchronizing the wearable computing device with the mobile computing device for said wireless communication.

In additional aspects of embodiments of the invention, displaying the visualization of the trading-related data on the display screen of the wearable computing device may comprise, for example, displaying a visualization of FX trading-related data on the display screen of the wearable computing device. In further aspects, displaying the visualization of the trading-related data on the display screen of the wearable computing device may involve, for example, displaying a visualization of at FX trading-related data consisting of at least one of FX pricing data, FX order data, and FX account misuse data on the display screen of the wearable computing device.

In other aspects of embodiments of the invention, displaying the visualization of the trading-related data on the display screen of the wearable computing device may involve, for example, displaying a visualization of FX trading-related biometric data on the display screen of the wearable computing device. Further aspects may involve, for example, receiving the trading-related data by the mobile computing device via a notification server from the one or more backend servers. Still further aspects may involve, for example, receiving the trading-related data by the mobile computing device via a web server from the one or more backend servers.

In additional aspects of embodiments of the invention, detecting the captured input on the wearable computing device by the mobile computing device may involve, for example, detecting the captured input on a touchscreen of the wearable computing device by the mobile computing device in wireless communication with the wearable computing device. In further aspects, detecting the captured input on a touchscreen of the wearable computing device may involve, for example, detecting the captured input as a swipe gesture on the touchscreen of the wearable computing device by the mobile computing device in wireless communication with the wearable computing device.

In other aspects of embodiments of the invention, detecting the captured input on the wearable computing device by the mobile computing device may involve, for example, detecting the captured input of a pause FX order command on the touchscreen of the wearable computing device by the mobile computing device in wireless communication with the wearable computing device. In still other aspects, detecting the captured input on the wearable computing device by the mobile computing device may involve, for example, detecting the captured input of a lock FX account command on the touchscreen of the wearable computing device by the mobile computing device in wireless communication with the wearable computing device.

In still further aspects of embodiments of the invention, forwarding the captured input by the mobile computing device to the one or more processors of one or more backend servers may involve, for example, forwarding the captured input of a pause FX order command by the mobile computing device to the one or more processors of one or more backend servers in communication with the mobile computing device. In additional aspects, forwarding the captured input by the mobile computing device to the one or more processors of one or more backend servers may involve, for example, forwarding the captured input of a lock FX account command by the mobile computing device to the one or more processors of one or more backend servers in communication with the mobile computing device. In other aspects, the mobile computing device may be, for example, a smart phone and the wearable computing device may be, for example, a smart watch.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention may employ computer hardware and software, including, without limitation, one or more processors coupled to memory and non-transitory computer-readable storage media with one or more executable computer application programs stored thereon which instruct the processors to perform the methods and systems for embodiments of the invention described herein. It is to be understood that the term "processor" as used herein, either standing alone or in combination, may refer to a computer processor. It is to be further understood that the term "application" as used herein, either standing alone or in combination, may refer to a computer application executing or executable on a processor coupled to memory. It is also to be understood that the term "touchscreen" as used herein refers to a display screen that is also an input device of a computing device including, without limitation, a mobile phone, such as a smart phone, and a wearable communication device, such as a smart watch.

Figure 1:
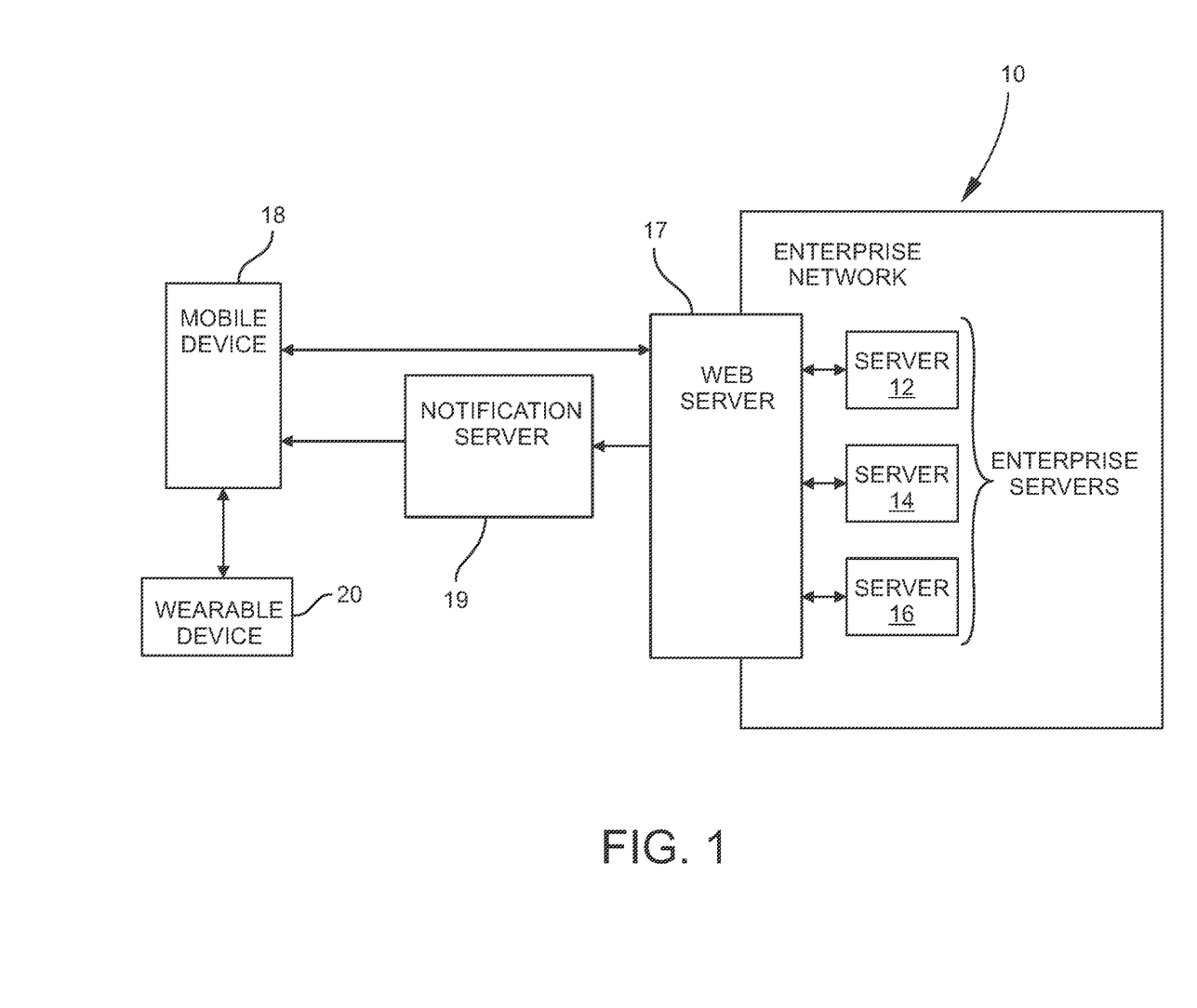
FIG. 1 is a schematic diagram that shows an overview example of components and the flow of information between components for embodiments of the invention.

FIG. 1 is a schematic diagram that shows an overview example of components and the flow of information between components for embodiments of the invention. Referring to FIG. 1, embodiments of the invention may employ, for example, one or more computer networks, such as enterprise network 10, both internal and external, one or more servers, such as enterprise servers 12, 14, 16, both internal and external, and one or more servers such as web server 17, in communication with such networks and servers. In addition, embodiments of the invention may employ one or more mobile communications devices 18 and one or more wearable communication devices 20, each having one or more processors coupled to memory and each running one or more operating systems and one or more applications.

Embodiments of the invention may employ a client, such as a mobile trading application, running on the mobile communication device 18, such as a smart phone, and an extension of the mobile application client that runs on the wearable device 20, such as a smart watch. Examples of suitable wearable communication devices may include a SAMSUNG GEAR LIVE® smart watch or other wearable devices running, for example, ANDROID WEAR® software available from GOOGLE®. It is to be understood, however, that embodiments of the invention may employ any other suitable wearable device running any other software.

In embodiments of the invention, the GUI displayed on the wearable device 20 may be an extension of the GUI displayed on the mobile communication device 18. Thus, when a gesture, such as a touch or swipe of a user's finger is captured on a touchscreen of the wearable device 20, the gesture may also be detected on the mobile device 18 via wireless communication between the wearable device 20 and the mobile device 18.

The mobile application for embodiments of the invention may be downloaded to the processor of the mobile communication device 18, such as the user's smartphone processor. If the smartphone 18 is in communication with the wearable device 20, such as the smart watch, the mobile application may extend to the processor of the wearable device 20. The processor of the smart watch 20 running the mobile application extension may not interact directly with the backend servers 12, 14, 16 of the enterprise, but instead may interact wirelessly with the processor of the mobile device 18 running the mobile application, and the mobile device 18 may in turn interact with one or more processors of one or more of the backend servers 12, 14, 16. It is to be understood, that all such communications may be securely encrypted using, for example, HTTPS, or some other suitable encryption protocol.

In embodiments of the invention, entry of a unique identifier, such as a PIN code, may be required to synchronize the smart watch 20 to the smart phone 18. Once the devices are synchronized and in wireless communication with one another, the user may log in to the trading account application on the mobile device 18. If the user acquires a new mobile device, the user may de-synchronize the smart watch from the former mobile device, download the mobile application to the new mobile device, and synchronize the smart watch with the new mobile device. The smart watch 20 must be in proximity to the mobile communication device 18 for the two devices to communicate with one another.

An aspect of embodiments of the invention may focus, for example, on an interaction type and screen size of the wearable device 20. A touch or swipe control aspect of embodiments of the invention may be employed in a foreign currency exchange (FX) trading application executing at least in part on the wearable device 20 having a touchscreen interface.

Embodiments of the invention may utilize the touchscreen of the wearable device 20, with mobile device 18 support for gestures. Such gestures may include, for example swipe gestures by the user using one or more of the user's fingers in contact with the wearable device 20 touchscreen. Such swipe gestures may include, but are not limited to, horizontal, vertical, diagonal, or arcuate movement of one or more of the user's fingers in contact with the touchscreen. The user may use such gestures to interact directly with the touchscreen display of the wearable device 20 without the need for any other input device, such as a mouse, keyboard, or even a virtual keypad. Thus, such aspect of embodiments of the invention may focus, for example, on convenience, usability and aesthetics.

In embodiments of the invention, a server, such as web server 17 may gather information, for example, from one or more of the various servers 12, 14, 16 of the enterprise and stream the gathered information to the client mobile application on the mobile communication device 18. In turn, the information may be communicated wirelessly from the mobile communication device 18 to the wearable device 20, for example, via the Bluetooth standard. Thus, the information may be displayed, for example, on the wearable device touchscreen that is an extension of the mobile device user interface.

In embodiments of the invention, the application running on the processor of the mobile device 18 may be characterized, for example, as a trading application. The processor of the mobile device 18 may be in communication with one or more processors of one or more backend servers 12, 14, 16, for example, via web server 17 from which information, such as current price information, may be received on a real-time basis. An aspect of the trading application may enable a user, such as an FX trader, to select one or more currency pairs in which the user may have an interest in pricing for display on the GUI of the wearable device 20.

In embodiments of the invention, the mobile application running on the processor of the mobile device 18 in communication with the extension of the mobile application client running on the processor of the wearable device 20 may cause information regarding the one or more currency pairs in which the user may have an interest to be displayed on the GUI of the wearable device 20. Thus, the currency pair pricing information in which the user may be interested may be identified by the processor of the mobile device running the mobile application, and the currency pair pricing information of interest to the user may be displayed on the wearable device 20 by the extension of the mobile application running on the processor of the wearable device.

Figure 2:
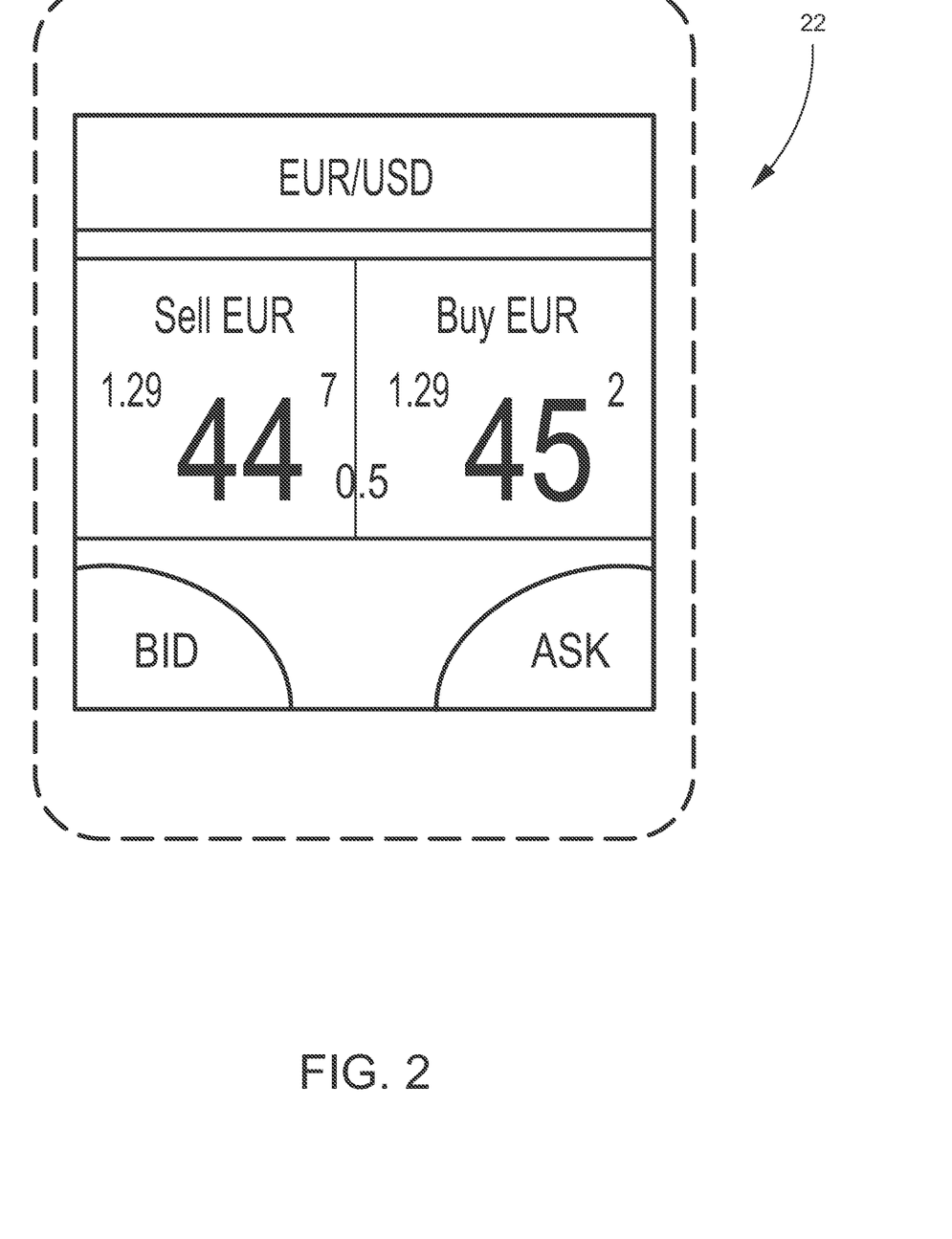
FIGS. 2, 3, and 4 show examples of wearable communication device interactive GUI touchscreen displays for an information aspect for embodiments of the invention.
Figure 3:
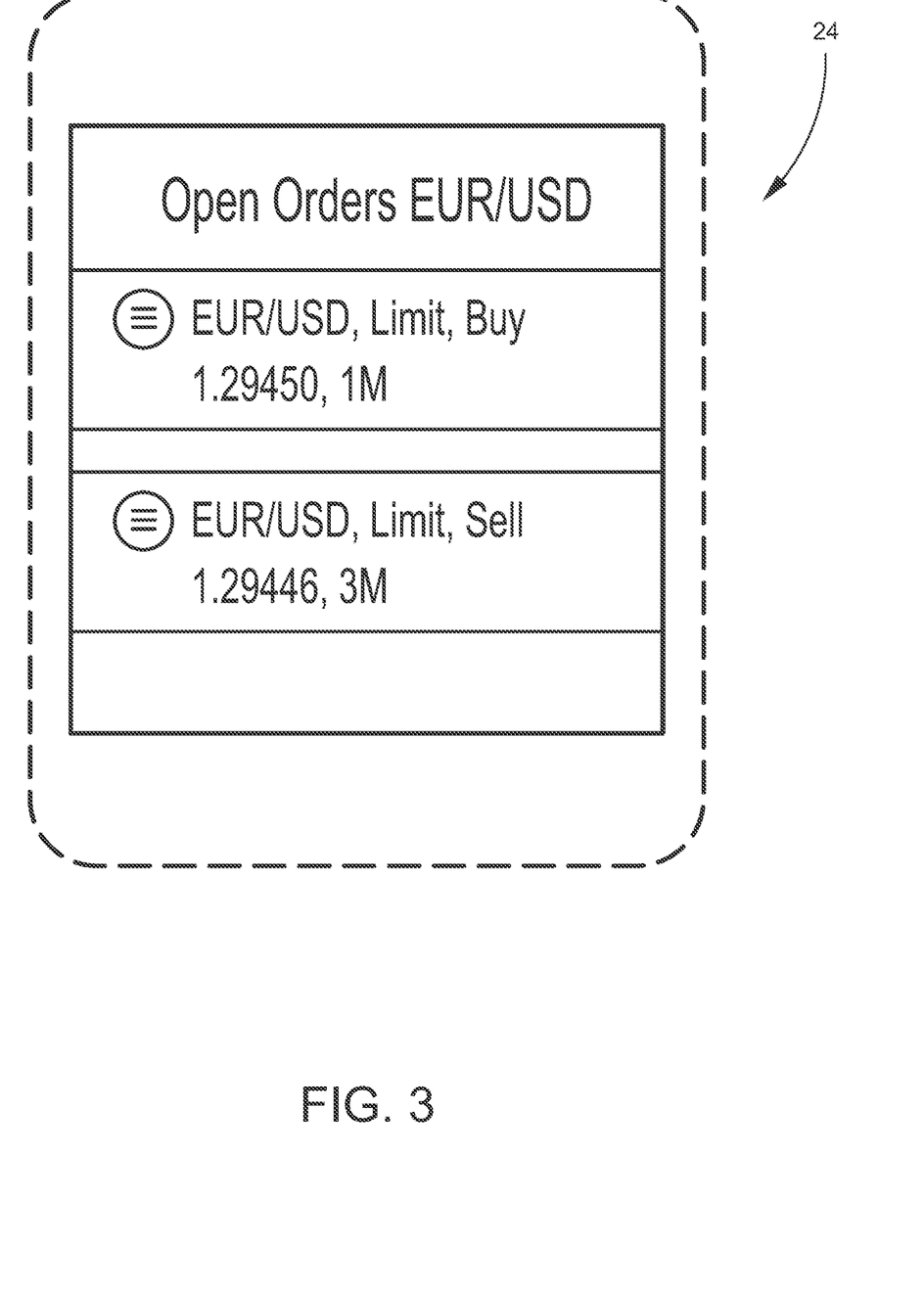
Figure 4:
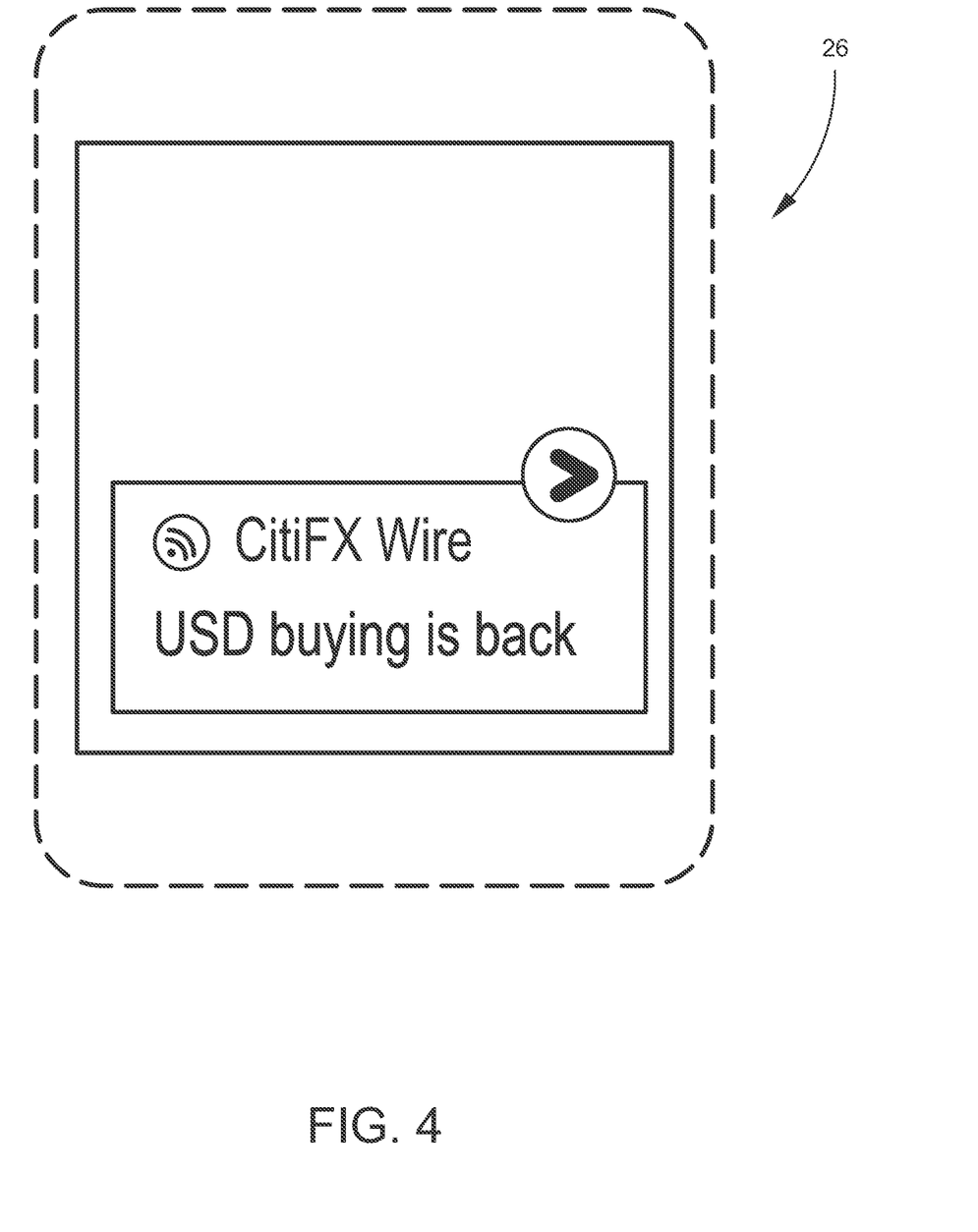

FIGS. 2, 3, and 4 show examples of wearable communication device interactive GUI touchscreen displays for an information aspect for embodiments of the invention. For example, embodiments of the invention may enable access to information relevant to a user's portfolio, such as FX pricing 22 shown in FIG. 2, open orders 24 shown in FIG. 3, and news updates on relevant currency pairs 26 shown in FIG. 4, via the wearable mobile communication device GUI touchscreen display.

Referring to FIG. 2, such FX pricing 22 may relate, for example, to bid and ask pricing for EUR/USD currency pairs, as well as bid and ask FX pricing for any other currency pairs of interest to the user. Referring to FIG. 4, such news updates may relate, for example, to current FX trade activity for particular currency pairs. In addition, such information may relate, for example, to displays of text messages, emails and notifications. Further, embodiments of the invention may enable the user to employ the wearable device 20 to open one or more corresponding applications on other computing devices of the user, such as the user's mobile device 18.

Embodiments of the invention may employ, for example, an FX wire application running on a processor of one or more servers 12, 14, 16 of the enterprise that may filter news update information, for example, according to various currency pairs in which the user has an interest and send the information to the user's mobile device. Further, the user may cause all notifications to be filtered, for example, by location or by one or more other simple or more complex criteria. In turn, the mobile application running on the processor of the mobile device 18 in communication with the extension of the mobile application client running on a processor of the wearable device 20 may cause the information to be displayed on the GUI of the wearable device. Such notifications may include, without limitation, information regarding completion of a particular FX trade of the user.

A further aspect of embodiments of the invention may involve, for example, monitoring, by one or more servers of the enterprise, log-ins or attempts to log in to a user's account, such as the user's trading account. Upon detecting a log-in or attempt to log in to the user's account, the one or more servers 12, 14, 16 of the enterprise may identify the location from which the log-in or log-in attempt originated and the location of the user's mobile communication device 18 using a GPS function of the mobile device or the wearable device 20 in communication with the mobile device 18.

In such aspect, if the two locations are different, a notification may be generated, for example, by a processor of a server, such as notification server 19, in communication with the mobile device 18 and displayed, for example, on the GUI of the wearable device 20 by the extension of the mobile application running on the wearable device processor. As a practical matter, because of potential GPS location accuracy issues, such a notification may be generated, for example, only if the two locations are greater than a predetermined distance from one another, such as more than 500 meters apart.

Figure 5:
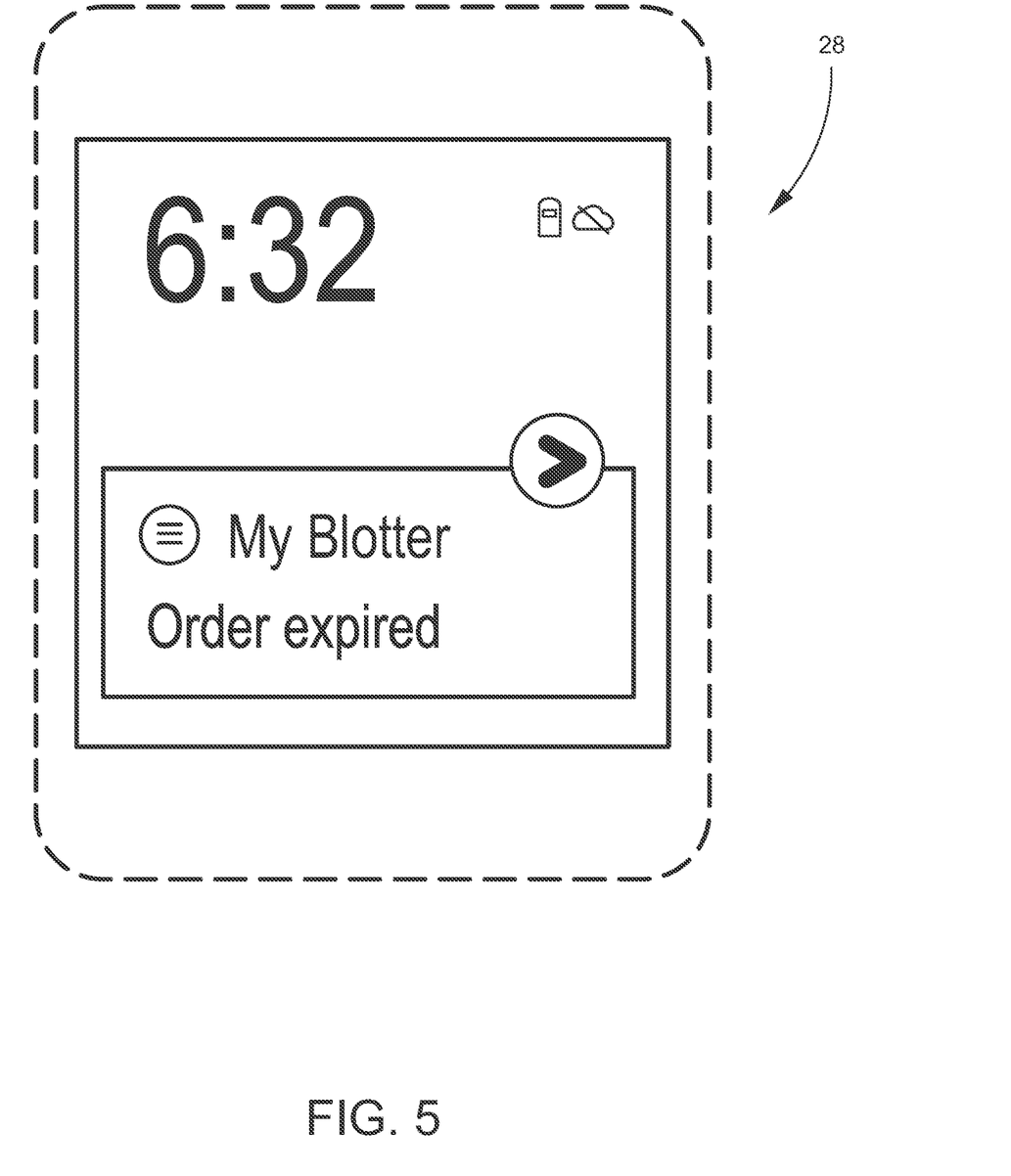
FIGS. 5 and 6 show examples of a wearable device interactive GUI touchscreen display of critical information notification for embodiments of the invention.
Figure 6:
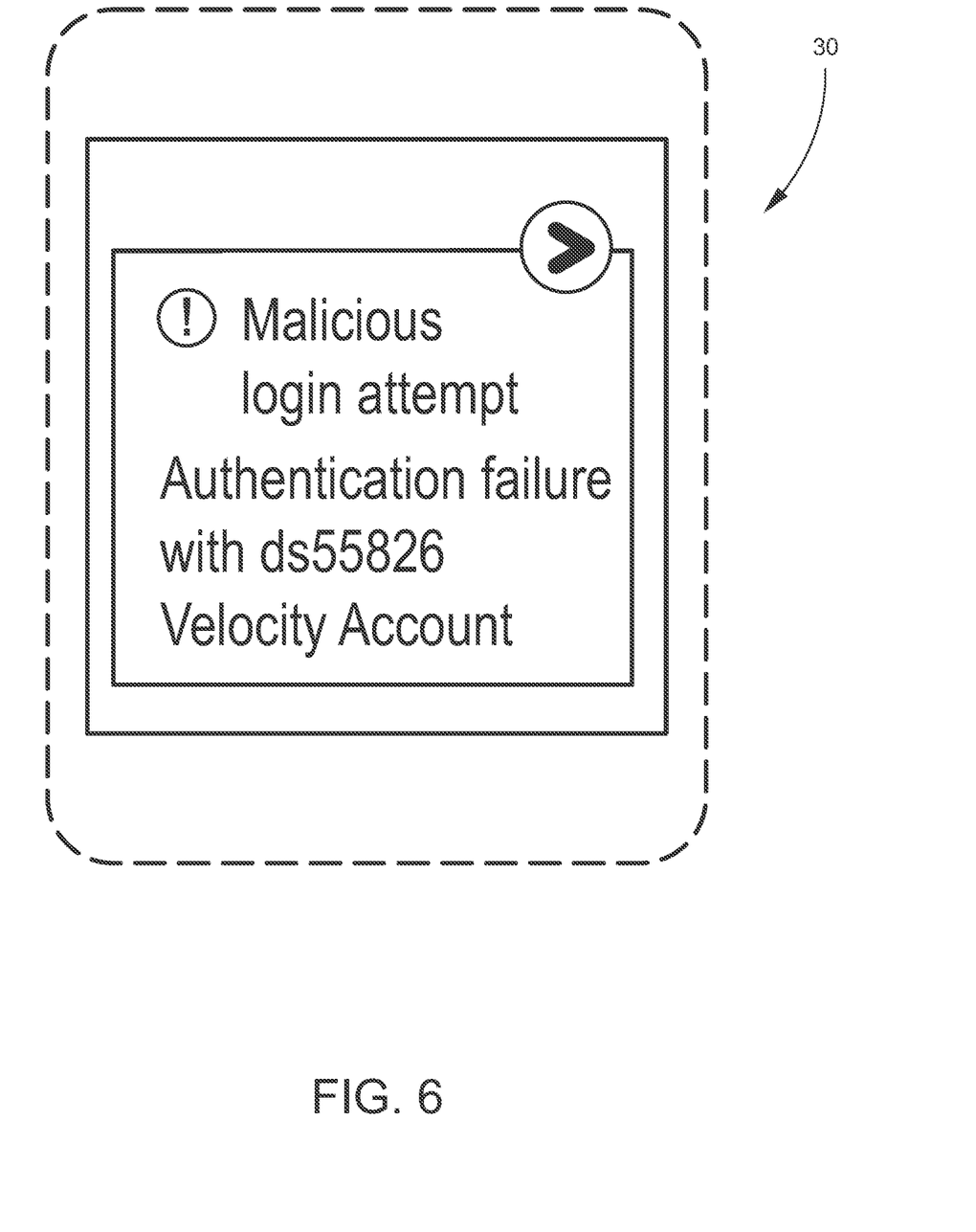

FIGS. 5 and 6 show examples of a wearable device interactive GUI touchscreen display of critical information notification for embodiments of the invention. Such wearable device GUI displays may provide notifications, such as order expiration 28 as shown in FIG. 5 or a malicious attempt to log in to the user's account 30 as shown in FIG. 6. Such wearable device GUI display may provide notifications at relevant times and places via the wearable device GUI touchscreen display for embodiments of the invention.

Figure 7:
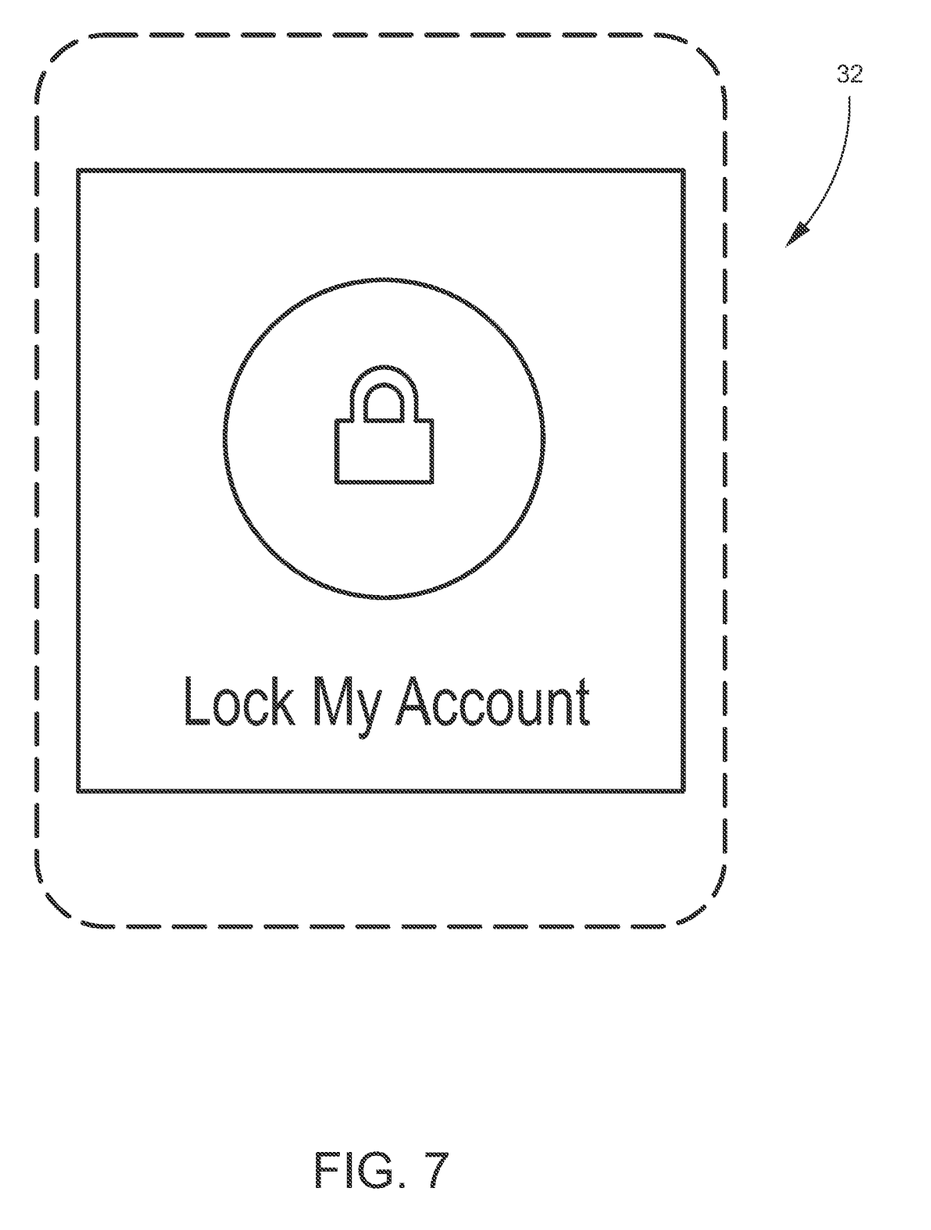
FIG. 7 shows an example of a wearable device interactive GUI touchscreen display of security features that enables remotely locking and preventing unauthorized use of the user's account via the wearable device GUI touchscreen display for embodiments of the invention.

FIG. 7 shows an example of a wearable device interactive GUI touchscreen display of security features that enables remotely locking and preventing unauthorized use of the user's account 32 via the wearable device GUI touchscreen display for embodiments of the invention. In the remote account locking aspect of embodiments of the invention, the extension of the mobile application running on the processor of the wearable device 20 may also display an option for the user on the GUI of the wearable device, for example, for the user to remotely lock the user's account 32.

Thus, when a notification of a malicious log-in or log-in attempt 30 is displayed on the GUI of the wearable device 20 by the extension of the mobile application running on the wearable device processor, the option for the user to remotely lock the user's account 32 may also be displayed on the GUI of the wearable device 20. If the user suspects an unauthorized access or attempt to access the user's account, the user may enter an immediate action, such as remotely locking the user's account, on the touchscreen display of the GUI of the wearable device 20, which may be transmitted via the user's mobile device 18 to a server 12, 14, or 16 of the enterprise.

As noted, in embodiments of the invention, the extension of the mobile application running on the processor of the wearable device 20 may also display open orders 24, such as open FX buy or sell orders, of the user as shown in FIG. 3. Referring to FIG. 3, such information may relate, for example, to EUR/USD open orders with details of such open orders. It is to be understood, however, that the open orders information may relate to any other currency pair. It is to be further understood that the user's access to the user's portfolio information is not limited to open orders but may include any and all information relevant to the user's portfolio.

Figure 8:
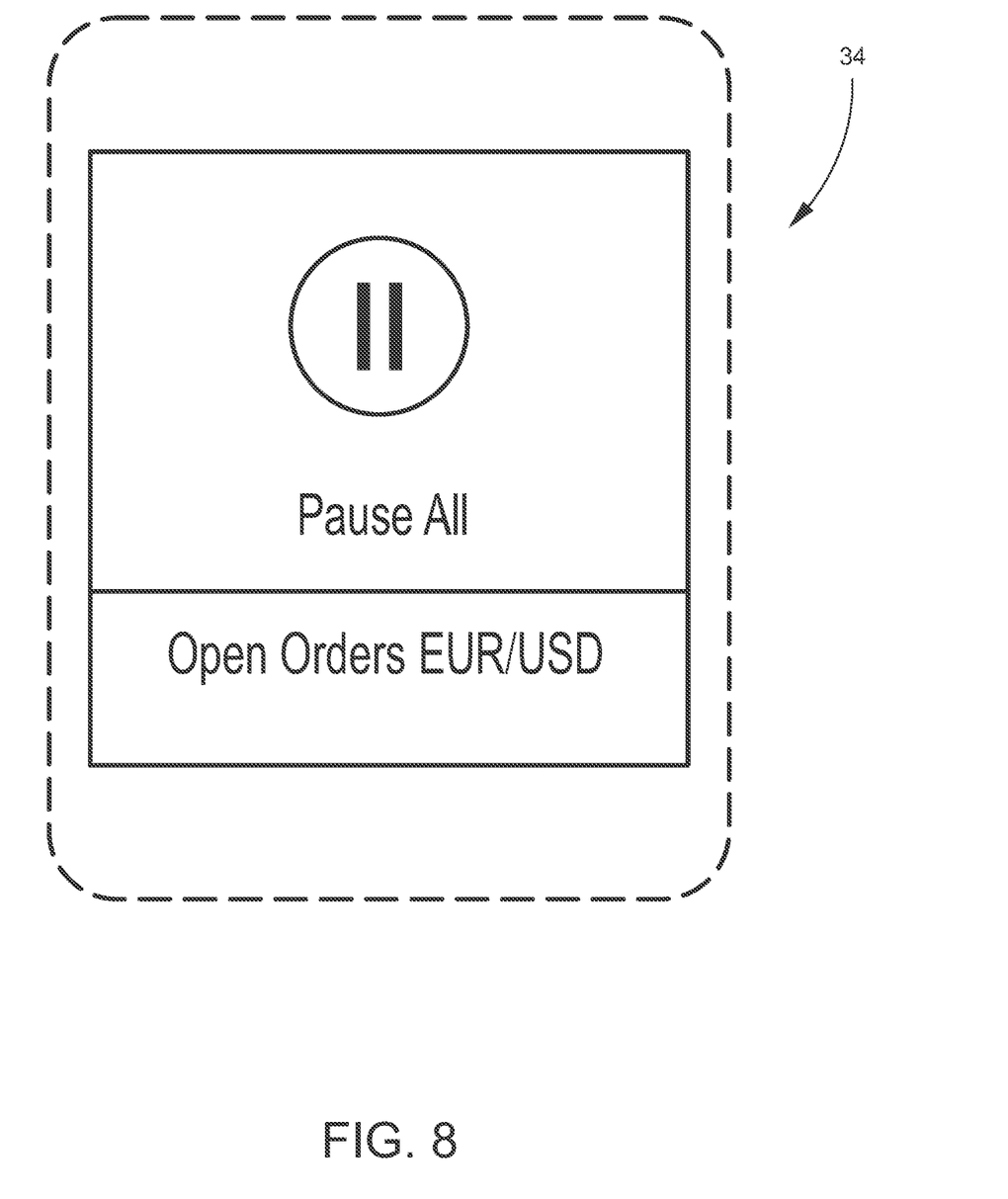
FIG. 8 illustrates an example of a GUI touchscreen of the wearable device screen display for embodiments of the invention for executing critical actions with a single click or gesture via the GUI touchscreen of the wearable communication device.

FIG. 8 illustrates an example of a GUI touchscreen of the wearable device screen display for embodiments of the invention for executing critical actions with a single click or gesture via the GUI touchscreen of the wearable communication device. Referring to FIG. 8, such critical actions may include, for example, remotely pausing or resuming all open orders 34 with a single click, touch, or gesture via the GUI touchscreen of the wearable device screen display for embodiments of the invention. It is to be understood that the foregoing is an example only and that critical actions may include any and all other actions that may be considered to be of reasonable importance in the management of the user's account.

Figure 9:
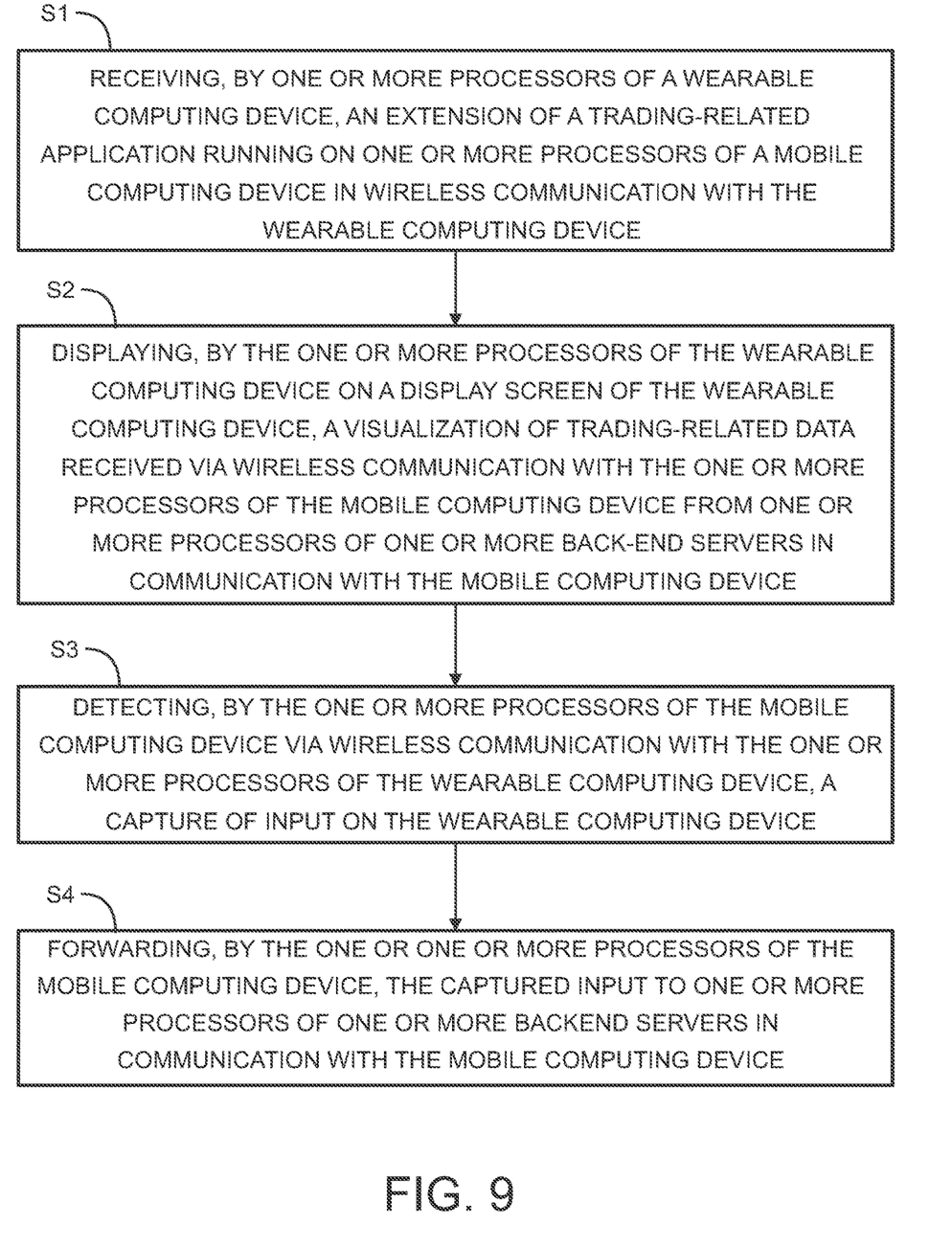
FIG. 9 is a flow chart that illustrates an example of a process of communications between backend servers and mobile and wearable computing devices for embodiments of the invention.

FIG. 9 is a flow chart that illustrates an example of a process of communications between backend servers and mobile and wearable computing devices for embodiments of the invention. Referring to FIG. 9, at S1, an extension of a trading-related application running on one or more processors of a mobile computing device may be received by one or more processors of a wearable computing device in wireless communication with the mobile computing device. At S2, a visualization of trading-related data received via wireless communication with the one or more processors of the mobile computing device from one or more processors of one or more back-end servers in communication with the mobile computing may be displayed by the one or more processors of the wearable computing device on a display screen of the wearable computing device. At S3, a capture of input on the wearable computing device may be detected by the one or more processors of the mobile computing device via wireless communication with the one or more processors of the wearable computing device. At S4, the captured input may be forwarded by the one or one or more processors of the mobile computing device to one or more processors of one or more backend servers in communication with the mobile computing device.

In addition, embodiments of the invention may provide the user with biometric indications, such as heart rate, while the user is trading via the wearable mobile communication device GUI touchscreen display for embodiments of the invention. For example, embodiments of the invention may provide one or more warnings to the user of irregular biometric measurements while the user is trading. Further, embodiments of the invention may, for example, provide statistics for the user on the user's profits and losses, as well as the user's heart rate.

It is to be understood that embodiments of the invention may be implemented as processes of a computer program product, each process of which is operable on one or more processors either alone on a single physical platform, such as a personal computer, a laptop computer, a smart phone, a smart watch or across a plurality of platforms, such as a system or network, including networks such as the Internet, an intranet, a Wide Area Network (WAN), a Local Area Network (LAN), a cellular network, or any other suitable network. Embodiments of the invention may employ client devices that may each comprise a computer-readable medium, including but not limited to, Random Access Memory (RAM) coupled to a processor. The processor may execute computer-executable program instructions stored in memory. Such processors may include, but are not limited to, a microprocessor, an Application Specific Integrated Circuit (ASIC), and/or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C #, Visual Basic, Java, Python, Perl, and JavaScript.

In addition, it is to be understood that client devices that may be employed by embodiments of the invention may also comprise a number of external or internal devices, such as a CD-ROM, DVD, touchscreen display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a RAM. Such server devices, which may be a single computer system, may also be implemented as a network of computer processors. Examples of such server devices are servers, mainframe computers, networked computers, a processor-based device, and similar types of systems and devices.

What is claimed is:

1. A method, comprising:
receiving, by one or more processors of a wearable computing device, an extension of an FX trading-related application for an FX trade-related account running on one or more processors of a mobile computing device in wireless interactive communication with the one or more processors of the wearable computing device;
displaying, by the one or more processors of the wearable computing device on a display screen of the wearable computing device, a visualization of FX trading-related data comprising FX pricing and FX open order data for the FX trade-related account received via wireless interactive communication with the one or more processors of the mobile computing device from one or more processors of one or more back-end servers in interactive communication with the mobile computing device;
detecting, by the one or more processors of the mobile computing device via wireless interactive communication with the one or more processors of the wearable computing device, a capture of input on the wearable computing device comprising data creating or amending at least one FX trade order for the FX trade-related account based at least in part on the FX pricing or FX open order data; and
forwarding, by the one or one or more processors of the mobile computing device, the captured input comprising the data creating or amending the at the least one FX trade order for the FX trade-related account based at least in part on the FX pricing or FX open order data to the one or more processors of the one or more backend servers in interactive communication with the mobile computing device.

2. The method of claim 1, wherein receiving the extension of the FX trading-related application by the one or more processors of the wearable computing device further comprises downloading the FX trading-related application to the one or more processors of the mobile computing device.

3. The method of claim 1, wherein receiving the extension of the FX trading-related application by the one or more processors of the wearable computing device further comprises synchronizing the wearable computing device with the mobile computing device for said wireless interactive communication.

4. The method of claim 1, further comprising displaying a visualization of FX trading-related account misuse data on the display screen of the wearable computing device.

5. The method of claim 1, further comprising receiving the FX trading-related data comprising the FX pricing and FX open order data by the mobile computing device via a notification server from the one or more backend servers.

6. The method of claim 1, further comprising receiving the FX trading-related data comprising the FX pricing and FX open order data by the mobile computing device via a web server from the one or more backend servers.

7. The method of claim 1, wherein detecting the capture of input on the wearable computing device by the mobile computing device further comprises detecting the capture of input on a touchscreen of the wearable computing device by the mobile computing device in wireless interactive communication with the wearable computing device.

8. The method of claim 7, wherein detecting the capture of input on the touchscreen of the wearable computing device by the mobile computing device further comprises detecting the capture of input as a swipe gesture on the touchscreen of the wearable computing device by the mobile computing device in wireless interactive communication with the wearable computing device.

9. The method of claim 1, wherein detecting the capture of input on the wearable computing device by the mobile computing device comprising data amending at least one FX trade order further comprises detecting the capture of input of a pause FX order command on the touchscreen of the wearable computing device by the mobile computing device in wireless interactive communication with the wearable computing device.

10. The method of claim 4, further comprising detecting the captured input of a lock FX account command on the touchscreen of the wearable computing device by the mobile computing device in wireless interactive communication with the wearable computing device.

11. The method of claim 1, wherein forwarding the captured input comprising data amending at least one FX trade order by the mobile computing device to the one or more processors of one or more backend servers further comprises forwarding the captured input of a pause FX order command by the mobile computing device to the one or more processors of the one or more backend servers in interactive communication with the mobile computing device.

12. The method of claim 10, further comprising forwarding the captured input of the lock FX account command by the mobile computing device to the one or more processors of the one or more backend servers in interactive communication with the mobile computing device.

13. The method of claim 1, wherein the mobile computing device comprises a smart phone and the wearable computing device comprises a smart watch.

14. A system, comprising:
by one or more processors of a wearable computing device programmed to:
receive an extension of an FX trading-related application for an FX trade-related account running on one or more processors of a mobile computing device in wireless interactive communication with the one or more processors of the wearable computing device;
display, on a display screen of the wearable computing device, a visualization of FX trading-related data comprising FX pricing and FX open order data for the FX trade-related account received via wireless interactive communication with the one or more processors of the mobile computing device from one or more processors of one or more back-end servers in interactive communication with the mobile computing device;
the one or more processors of the mobile computing device being programmed to:
detect, via wireless interactive communication with the one or more processors of the wearable computing device, a capture of input on the wearable computing device comprising data creating or amending at least one FX trade order for the FX trade-related account based at least in part on the FX pricing or FX open order data; and forward the captured input comprising the data creating or amending the at the least one FX trade order for the FX trade-related account based at least in part on the FX pricing or FX open order data to the one or more processors of the one or more backend servers in interactive communication with the mobile computing device.

15. A device, comprising:

a wearable computing device having one or more processors programmed to:

receive an extension of an FX trading-related application for an FX trade-related account running on one or more processors of a mobile computing device in wireless interactive communication with the one or more processors of the wearable computing device;

display, on a display screen of the wearable computing device, a visualization of FX trading-related data comprising FX pricing and FX open order data for the FX trade-related account received via wireless interactive communication with the one or more processors of the mobile computing device from one or more processors of one or more back-end servers in interactive communication with the mobile computing device;

capture input on the wearable computing device comprising data creating or amending at least one FX trade order for the FX trade-related account based at least in part on the FX pricing or FX open order data; and forward the captured input comprising the data creating or amending the at the least one FX trade order for the FX trade-related account based at least in part on the FX pricing or FX open order data to the one or more processors of a mobile computing device in interactive communication with the one or more processors of the one or more backend servers.

* * * * *